UNITED STATES PATENT OFFICE.

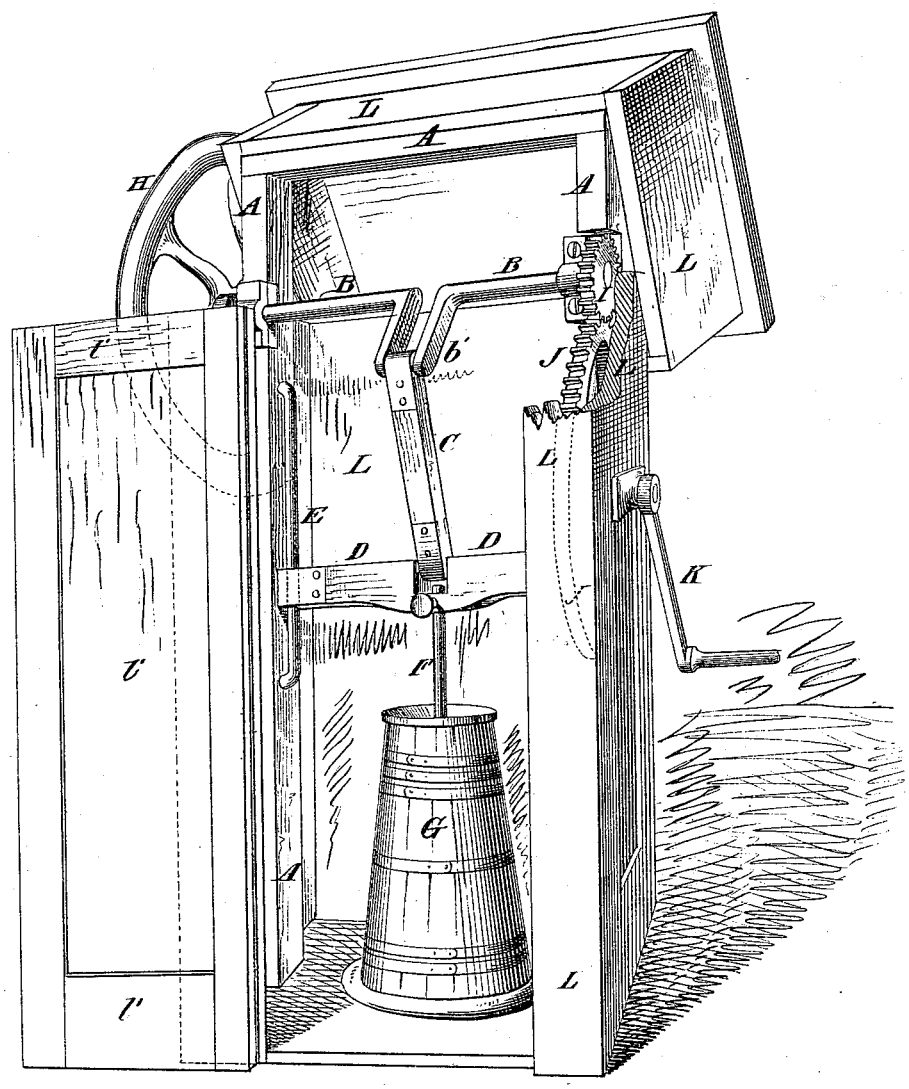

ALFRED F. MORGAN, OF MASON CITY, IOWA, ASSIGNOR OF TWO-THIRDS HIS RIGHT TO CHESTER B. SEABERRY AND JOSEPH A. CASE, OF SAME PLACE.

IMPROVEMENT IN RECIPROCATING CHURNS.

Specification forming part of Letters Patent No. 192,449, dated June 26, 1877; application filed December 27, 1875.

*To all whom it may concern:*

Be it known that I, ALFRED F. MORGAN, of Mason City, Cerro Gordo county, Iowa, have invented a new and Improved Churning Apparatus, of which the following is a specification:

The figure is a perspective view of my improved churning apparatus, the upper part being partly removed, and part being broken away to show the construction.

The object of this invention is to furnish an improved churning apparatus, which shall be simple in construction, easily operated, and effective in operation, and which may be used as a safe to protect the milk from flies and dust.

The invention consists in the combination of the frame, the crank-shaft, the connecting-rod, the cross-head, the guide-rods, the fly-wheel, the gear-wheels, and the crank with each other and with the dasher-handle of the churn, as hereinafter fully described.

A is a frame, consisting of two posts set at such a distance apart as to receive the churn between them, and connected at their upper ends by a cross-bar.

In bearings attached to the upper part of the posts of the frame A revolves a shaft, upon the middle part of which is formed a crank, $b'$, to which is pivoted the upper end of a connecting-bar, C.

The lower end of the connecting-bar C is pivoted to a cross-head, D, the ends of which slide up and down upon guide-rods, E, the ends of which are bent outward and are attached to the posts of the frame A.

To the center of the cross-head D is detachably secured, by a pin, the upper end of the dasher-handle F of the churn G.

To one end of the shaft B is attached a fly-wheel, H, one side of which is made heavier than the other, to balance the weight of the crank $b'$ and the cross-head D.

To the other end of the shaft B is attached a small gear-wheel, I, the teeth of which mesh into the teeth of a large gear-wheel, J, which is pivoted to the post of the frame A, and to the outer journal of which is attached the crank K for operating the apparatus.

The apparatus is surrounded, except the fly-wheel H and the crank K, with a case, L, the upper part of which may be made detachable, and which is provided with a door, $l'$, as shown in the drawing.

The case L protects the churn, and at the same time covers the working mechanism, so that it will be impossible for any one to be injured by it.

The milk may be put into the churn G, and the churn placed in the case L, which will protect it from flies and dust.

Having thus described my invention, I claim as new and desire to secure by Letters Patent—

The frame A, provided with the guide-rods E, in combination with the cross-head D, adjustable dasher-handle F, pivoted bar C, crank-arm B, and fly-wheel H, substantially as described, and for the purpose set forth.

ALFRED FREEMAN MORGAN.

Witnesses:
ALONZO WILLSON,
S. WATSON CLARK.